US012592047B2

(12) United States Patent
Luo et al.

(10) Patent No.: US 12,592,047 B2
(45) Date of Patent: Mar. 31, 2026

(54) METHOD AND APPARATUS FOR INTERACTION IN THREE-DIMENSIONAL SPACE, STORAGE MEDIUM, AND ELECTRONIC APPARATUS

(71) Applicant: ZTE Corporation, Shenzhen (CN)

(72) Inventors: Yibao Luo, Shenzhen (CN); Qiaoyun Cui, Shenzhen (CN); Jinjun Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/575,921

(22) PCT Filed: Aug. 16, 2022

(86) PCT No.: PCT/CN2022/112861
§ 371 (c)(1),
(2) Date: Jan. 2, 2024

(87) PCT Pub. No.: WO2023/124113
PCT Pub. Date: Jul. 6, 2023

(65) Prior Publication Data
US 2024/0338905 A1      Oct. 10, 2024

(30) Foreign Application Priority Data
Dec. 31, 2021      (CN) .......................... 202111679046.7

(51) Int. Cl.
*G06T 19/00*         (2011.01)
*G06F 3/01*          (2006.01)
*G06T 7/246*         (2017.01)

(52) U.S. Cl.
CPC ............ *G06T 19/006* (2013.01); *G06F 3/011* (2013.01); *G06F 3/017* (2013.01); *G06T 7/246* (2017.01); *G06T 2207/30241* (2013.01)

(58) Field of Classification Search
CPC ................... G06T 19/006; G06T 7/246; G06T 2207/30241; G06F 3/011; G06F 3/017;
(Continued)

(56) References Cited

U.S. PATENT DOCUMENTS 10,352,693 B2 *   7/2019   Abovitz .............. G06F 3/04883
10,380,803 B1 *   8/2019   Jaafar ................... G06T 19/006
(Continued)

FOREIGN PATENT DOCUMENTS

CN         112862935 A      5/2021
CN         113117327 A      7/2021

OTHER PUBLICATIONS

International Search Report for corresponding application filed Aug. 16, 2022; Mail date Nov. 18, 2022.
(Continued)

*Primary Examiner* — Motilewa Good-Johnson
(74) *Attorney, Agent, or Firm* — CANTOR COLBURN LLP

(57)         ABSTRACT
Provided are a method and apparatus for interaction in a three-dimensional space. The method includes: displaying a target augmented reality three-dimensional picture on a target augmented reality device, and displaying a target virtual interaction object in a virtual three-dimensional space in the target augmented reality three-dimensional picture, wherein the real three-dimensional space is rasterized and the virtual three-dimensional space is rasterized, and there is a mapping relationship therebetween; acquiring a target movement trajectory of a target object in the real three-dimensional space; determining a real cell set through which the target movement trajectory passes; determining a passing first virtual cell set corresponding to the passing real cell set; and determining whether the target movement trajectory triggers a target interaction operation of the target virtual
(Continued)

interaction object according to the position relationship between the first virtual cell set and a second virtual cell set.

19 Claims, 9 Drawing Sheets

(58) Field of Classification Search
CPC .... A63F 13/428; A63F 13/573; A63F 13/577; A63F 13/65; A63F 13/213
See application file for complete search history.

(56) References Cited

U.S. PATENT DOCUMENTS

| | | | |
|---|---|---|---|
| 12,229,874 B1 * | 2/2025 | Mousseau | G06T 19/006 |
| 2012/0113223 A1 * | 5/2012 | Hilliges | G06F 3/011 |
| | | | 348/46 |
| 2014/0160162 A1 | 6/2014 | Balachandreswaran et al. | |
| 2015/0356787 A1 | 12/2015 | Abe et al. | |
| 2016/0071320 A1 * | 3/2016 | Smith | G06T 19/006 |
| | | | 345/633 |
| 2018/0095542 A1 * | 4/2018 | Mallinson | G06T 19/006 |
| 2018/0350136 A1 | 12/2018 | Rowley | |
| 2019/0317974 A1 | 10/2019 | Chamberlin et al. | |
| 2021/0365707 A1 * | 11/2021 | Mao | G06V 10/62 |
| 2024/0112428 A1 * | 4/2024 | Levi | G06T 19/006 |
| 2024/0338905 A1 * | 10/2024 | Luo | A63F 13/577 |

OTHER PUBLICATIONS

European Search Report for corresponding application EP22913398; Report dated Oct. 24, 2024.

* cited by examiner

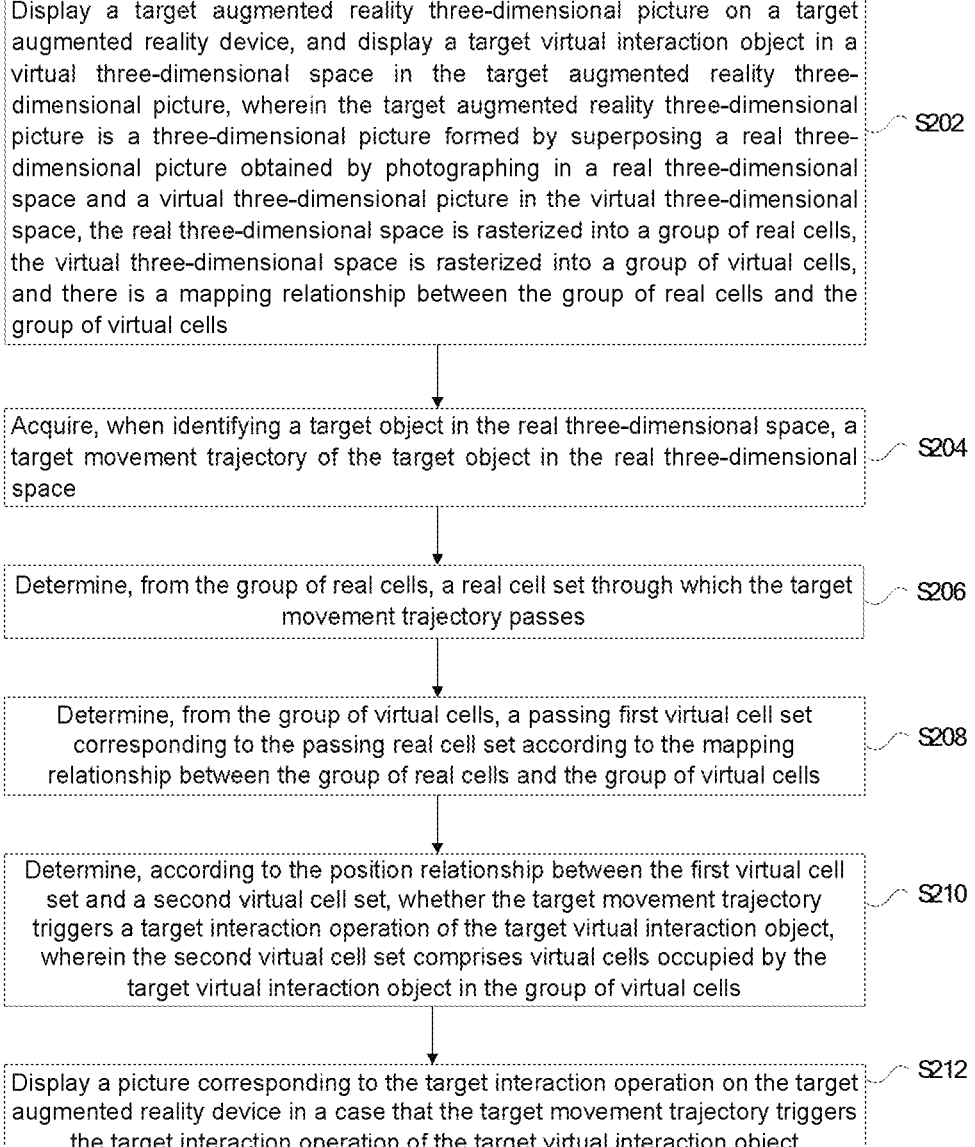

Display a target augmented reality three-dimensional picture on a target augmented reality device, and display a target virtual interaction object in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells                                        — S202

Acquire, when identifying a target object in the real three-dimensional space, a target movement trajectory of the target object in the real three-dimensional space                                        — S204

Determine, from the group of real cells, a real cell set through which the target movement trajectory passes                                        — S206

Determine, from the group of virtual cells, a passing first virtual cell set corresponding to the passing real cell set according to the mapping relationship between the group of real cells and the group of virtual cells                                        — S208

Determine, according to the position relationship between the first virtual cell set and a second virtual cell set, whether the target movement trajectory triggers a target interaction operation of the target virtual interaction object, wherein the second virtual cell set comprises virtual cells occupied by the target virtual interaction object in the group of virtual cells                                        — S210

Display a picture corresponding to the target interaction operation on the target augmented reality device in a case that the target movement trajectory triggers the target interaction operation of the target virtual interaction object                                        — S212

Fig. 2

METHOD AND APPARATUS FOR INTERACTION IN THREE-DIMENSIONAL SPACE, STORAGE MEDIUM, AND ELECTRONIC APPARATUS

CROSS-REFERENCE TO RELATED APPLICATION

The present disclosure is a national stage filing under 35 U.S.C. § 371 of international application number PCT/CN2022/112861, filed Aug. 16, 2022, which claims the priority to Chinese patent application no. CN 202111679046.7 filed on Dec. 31, 2021, the disclosure of which is incorporated herein by reference in its entirety.

TECHNICAL FIELD

Embodiments of the present disclosure relate to the technical field of human-machine interaction, and in particular, to a method and apparatus for interaction in a three-dimensional space, a storage medium, and an electronic apparatus.

BACKGROUND

In recent years, with the wide application and popularization of computer technology, human-machine interaction technology has gradually become a research hotspot, for example, Augmented Reality (AR) and Virtual Reality (VR) technologies have also been developed rapidly.

Currently, AR or VR scenario interoperation is mainly used in game scenarios, and relatively mature systems include Microsoft's kinect and Nintendo's Wii motion-sensing handle and fitness ring, etc.; common points of these devices are based on the position in a 2D plane, interoperation confirmation is performed on VR or AR scenarios, and systems like kinect are only applicable to interconnection operations in a two-dimensional virtual space and real space, and such an interaction method greatly limits the application scenarios thereof.

Regarding the technical problem of narrow application range of the interaction method in the related art, no effective solution has been proposed.

SUMMARY

Embodiments of the present disclosure provide a method and apparatus for interaction in a three-dimensional space, a storage medium, and an electronic apparatus, so as to at least solve the technical problem of narrow application range of the interaction method in the related art.

According to some embodiments of the present disclosure, provided is a method for interaction in a three-dimensional space, including: a target augmented reality three-dimensional picture is displayed on a target augmented reality device, and a target virtual interaction object is displayed in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells; when identifying a target object in the real three-dimensional space, a target movement trajectory of the target object in the real three-dimensional space is acquired; a real cell set through which the target movement trajectory passes is determined from the group of real cells; a passing first virtual cell set corresponding to the passing real cell set is determined from the group of virtual cells according to the mapping relationship between the group of real cells and the group of virtual cells; whether the target movement trajectory triggers a target interaction operation of the target virtual interaction object is determined according to the position relationship between the first virtual cell set and a second virtual cell set, wherein the second virtual cell set includes virtual cells occupied by the target virtual interaction object in the group of virtual cells; and in a case that the target movement trajectory triggers the target interaction operation of the target virtual interaction object, a picture corresponding to the target interaction operation is displayed on the target augmented reality device.

According to some other embodiments of the present disclosure, provided is an apparatus for interaction in a three-dimensional space, including: a first display module, configured to display a target augmented reality three-dimensional picture on a target augmented reality device, and display a target virtual interaction object in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells; a first acquisition module, configured to acquire, when identifying a target object in the real three-dimensional space, a target movement trajectory of the target object in the real three-dimensional space; a first determination module, configured to determine, from the group of real cells, a real cell set through which the target movement trajectory passes; a second determination module, configured to determine, from the group of virtual cells, a passing first virtual cell set corresponding to the passing real cell set according to the mapping relationship between the group of real cells and the group of virtual cells; a third determination module, configured to determine, according to the position relationship between the first virtual cell set and a second virtual cell set, whether the target movement trajectory triggers a target interaction operation of the target virtual interaction object, wherein the second virtual cell set includes virtual cells occupied by the target virtual interaction object in the group of virtual cells; and a second display module, configured to display a picture corresponding to the target interaction operation on the target augmented reality device in a case that the target movement trajectory triggers the target interaction operation of the target virtual interaction object.

According to still some other embodiments of the present disclosure, a computer-readable storage medium is further provided, the computer-readable storage medium stores a computer program, wherein the computer program is configured to execute the steps in any one of the method embodiments when running.

According to still some other embodiments of the present disclosure, an electronic apparatus is further provided, and the electronic apparatus includes a memory and a processor; wherein the memory stores a computer program, and the processor is configured to run the computer program to execute the steps in any one of the method embodiments.

BRIEF DESCRIPTION OF THE DRAWINGS

The drawings illustrated herein are used for providing further understanding of the present disclosure and constitute a part of some embodiments of the present disclosure, and the illustrative embodiments of the present disclosure and illustrations thereof are used for explaining the present disclosure, rather than constitute inappropriate limitation on the present disclosure. In the drawings:

FIG. 2 is a flowchart of a method for interaction in a three-dimensional space according to embodiments of the present disclosure;

DETAILED DESCRIPTION OF THE EMBODIMENTS

In order to enable a person skilled in the art to understand the solutions of the present disclosure better, hereinafter, the technical solutions in the embodiments of the present disclosure will be described clearly and thoroughly with reference to the accompanying drawings of embodiments of the present disclosure. Obviously, the embodiments as described are only some of embodiments of the present disclosure, and are not all the embodiments. On the basis of the embodiments in the present disclosure, all other embodiments obtained by a person of ordinary skill in the art without any inventive effort shall all fall within the scope of protection of the present disclosure.

It should be noted that the terms "first", "second" etc. in the description, claims, and accompanying drawings of the present disclosure are used to distinguish similar objects, and are not necessarily used to describe a specific sequence or order. It should be understood that the data so used may be interchanged where appropriate so that embodiments of the present disclosure described herein may be implemented in sequences other than those illustrated or described herein. In addition, the terms "include" and "have", and any variations thereof are intended to cover a non-exclusive inclusion, for example, a process, method, system, product, or device that includes a series of steps or units is not necessarily limited to those steps or units that are clearly listed, but may include other steps or units that are not clearly listed or inherent to such process, method, product, or device.

Figure 1:
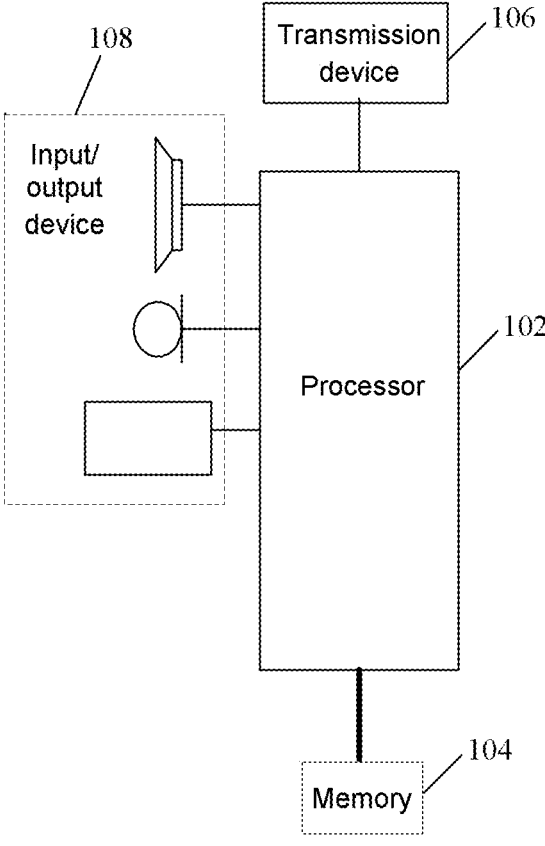
FIG. 1 is a structural block diagram of hardware of a mobile terminal for a method for interaction in a three-dimensional space according to embodiments of the present disclosure.

Methods provided in the embodiments of the present disclosure can be executed in a mobile terminal, a computer terminal or a similar computing apparatus. Taking the method embodiments being executed on a mobile terminal as an example, FIG. 1 is a structural block diagram of hardware of a mobile terminal for a method for interaction in a three-dimensional space according to embodiments of the present disclosure. As shown in FIG. 1, a mobile terminal may include: one or more (FIG. 1 shows only one) processors 102 (the processors 102 may include, but not limited to processing apparatus such as a micro processor, MCU or a programmable logic device, FPGA); and a memory 104 for storing data; wherein the mobile terminal can further include a transmission device 106 and an input/output device 108 for communication functions. A person of ordinary skill in the art would understand that the structure as shown in FIG. 1 is merely exemplary, and does not limit the structure of the mobile terminal. For example, the mobile terminal may also include more or fewer assemblies than those shown in FIG. 1, or have different configuration from that shown in FIG. 1.

The memory 104 may be configured to store a computer program, for example, a software program and module of application software, such as a computer program corresponding to the method for interaction in a three-dimensional space in the embodiments of the present disclosure; and the processor 102 executes various functional applications and data processing by running the computer program stored in the memory 104, i.e. implementing the described method. The memory 104 may include a high-speed random access memory, and may also include a non-transitory memory, such as one or more magnetic storage apparatuses, flash memories or other non-transitory solid-state memories. In some examples, the memory 104 may further include memories remotely arranged with respect to the processors 102, and these remote memories may be connected to the mobile terminal via a network. Examples of the network include, but are not limited to the Internet, an intranet, a local area network, a mobile communication network and combinations thereof.

The transmission apparatus 106 is configured to receive or send data via a network. Specific examples of the network may include a wireless network provided by a communication provider of the mobile terminal. In one example, the transmission apparatus 106 includes a network adapter (Network Interface Controller, NIC for short) which may be connected to other network devices by means of a base station, thereby being able to communicate with the Internet. In one example, the transmission device 106 may be a radio frequency (RF for short) module which is configured to communicate with the Internet in a wireless manner.

The present embodiment provides a method for interaction in a three-dimensional space. FIG. 2 is a flowchart of a method for interaction in a three-dimensional space according to embodiments of the present disclosure. As shown in FIG. 2, the flow includes the following steps:

step S202, a target augmented reality three-dimensional picture is displayed on a target augmented reality device, and a target virtual interaction object is displayed in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells;

step S204, when identifying a target object in the real three-dimensional space, a target movement trajectory of the target object in the real three-dimensional space is acquired;

step S206, a real cell set through which the target movement trajectory passes is determined from the group of real cells;

step S208, a passing first virtual cell set corresponding to the passing real cell set is determined from the group of virtual cells according to the mapping relationship between the group of real cells and the group of virtual cells;

step S210, whether the target movement trajectory triggers a target interaction operation of the target virtual interaction object is determined according to the position relationship between the first virtual cell set and a second virtual cell set, wherein the second virtual cell set includes virtual cells occupied by the target virtual interaction object in the group of virtual cells; and step S212, in a case that the target movement trajectory triggers the target interaction operation of the target virtual interaction object, a picture corresponding to the target interaction operation is displayed on the target augmented reality device.

By the described steps, by acquiring a target movement trajectory of a target object in a real three-dimensional space, then determining a real cell set through which the target movement trajectory passes, then determining a first virtual unit set of a virtual three-dimensional space corresponding to the real cell set according to a pre-established mapping relationship between the real three-dimensional space and a virtual three-dimensional space, then determining, according to the position relationship between the first virtual cell set and a second virtual cell set, whether the target movement trajectory triggers a target virtual interaction object, wherein the second virtual cell set includes virtual cells occupied by the target virtual interaction object, and when the target movement trajectory triggers a target interaction operation of the target virtual interaction object, a picture corresponding to the execution of the target interaction operation is displayed on a target augmented reality device, that is, by the operation of the target object in the real three-dimensional space, the objective of triggering the target interaction operation of the target virtual interaction object in the virtual three-dimensional space is achieved, and a picture corresponding to the target interaction operation is displayed and executed on the target augmented reality device. By the present embodiment, an interaction operation in a three-dimensional space is realized, the technical problem of narrow application range of the interaction method in the related art is solved, and the effect of broadening the application range of the interaction method is achieved.

The execution subject of the described steps may be an interaction system, for example, a human-machine interaction system, a three-dimensional interaction system, an AR interaction system (or device), or a VR interaction system (or device); and the execution subject of the described steps may also be other processing devices or processing units that have similar processing capability, but is not limited thereto. Hereinafter, illustration is made by taking the described operations being executed on an AR interaction system as an example (which is only an exemplary illustration, and in an actual operation, other devices or modules may also be used to execute the described operations):

in the embodiments above, a target augmented reality three-dimensional picture is displayed on a target augmented reality device, for example, the target augmented reality three-dimensional picture is a three-dimensional picture formed by superposing a real three-dimensional picture obtained by photographing in a real three-dimensional space and a virtual three-dimensional picture in a virtual three-dimensional space, and a target virtual interaction object is displayed in the virtual three-dimensional space in the target augmented reality three-dimensional picture. For example, taking a game scenario as an example, the target virtual interaction object may be a confirmation key or a prop or other objects for interacting with a user in a virtual interface. In practical applications, a mapping relationship between the real three-dimensional space and the virtual three-dimensional space may be pre-established. Optionally, the real three-dimensional space is rasterized into a group of real cells, the virtual three-dimensional space is rasterized into a group of virtual cells, and thus there is a mapping relationship between the group of real cells and the group of virtual cells. When identifying a target object in the real three-dimensional space, a target movement trajectory of the target object in the real three-dimensional space is acquired. For example, the target object may be an optical card, or a cursor card, or an optical card integrated with a cursor card, or a ranging card, or an optical label, or an Ultra Wide Band (UWB for short) label, or a millimeter wave forwarding beacon point, or the like, and may also be a user wearing a certain type of the cards or labels, for example, an optical card or an optical label, etc. is worn on the finger of the user. In practical applications, the AR interaction system needs to be configured with a collection module for collecting spatial data, such as angle or distance or other data of the target object in the real three-dimensional space, so as to determine coordinates of the target object in the real three-dimensional space. The collection module may include one or more ranging modules, for example, may include one or more modules of a UWB module, a millimeter wave ranging module and an optical ranging module; of course, other collection modules may also be included. In practical applications, different ranging modules or ranging module combinations may be selected according to different application scenarios. Then, a real cell set through which the target movement trajectory passes can be determined from the group of real cells in the real three-dimensional space; then a passing first virtual cell set corresponding to the passing real cell set is determined from the group of virtual cells according to the mapping relationship between the group of real cells and the group of virtual cells; that is, the first virtual cell set is a corresponding cell set in the virtual three-dimensional space to which a real cell set in the real three-dimensional space is mapped, or may be understood as a movement trajectory after the movement trajectory of the target object in the real three-dimensional space is mapped to the virtual three-dimensional space, e.g. a movement trajectory of a cursor in the virtual three-dimensional space, wherein virtual cells through which the movement trajectory passes is the first virtual cell set; then, whether the target movement trajectory triggers a target interaction operation of a target virtual interaction object is determined according to the position relationship between the first virtual cell set and a second virtual cell set, wherein the second virtual cell set includes virtual cells occupied by the target virtual interaction object in the group of virtual cells, for example, the target virtual interaction object may occupy only one virtual cell, and may also occupy multiple virtual cells; in a case that the target movement trajectory triggers the target interaction operation of the target virtual interaction object, for example, an operation on the target virtual interaction object may be a single-click or double-click or other modes, a picture corresponding to the target interaction operation is displayed and executed on the target augmented reality device; for example, when it is determined that the target interaction operation of the target virtual interaction object is triggered, a picture corresponding to the target interaction operation is displayed and executed on the target augmented reality device, that is, the target movement trajectory of the target object in the real three-dimensional space is responded to, thereby realizing an interaction operation in the three-dimensional space, thereby solving the technical problem of narrow application range of the interaction method in the related art, and achieving the effect of broadening the application range of the interaction method.

Figure 3:
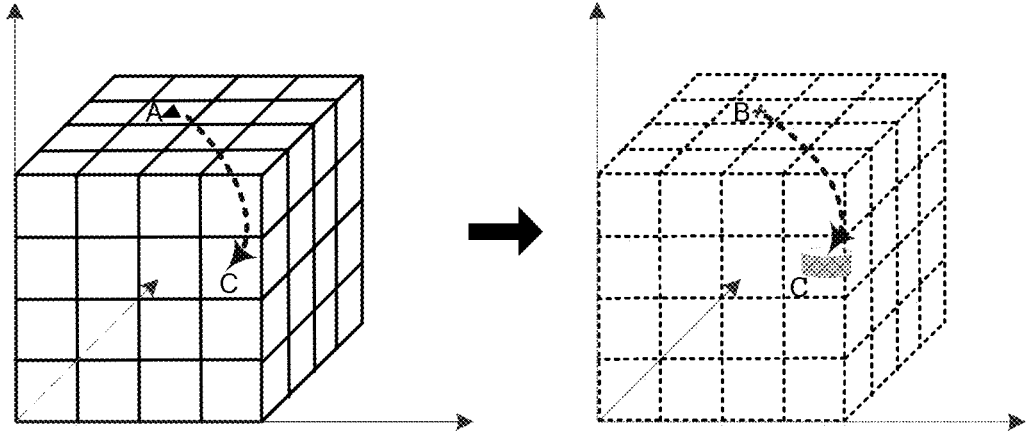
FIG. 3 is a schematic diagram of a relationship between a real space and a virtual space according to embodiments of the present disclosure.

FIG. 3 is a schematic diagram of a relationship between a real space and a virtual space according to embodiments of the present disclosure. As shown in FIG. 3, the left side in FIG. 3 corresponds to a raster map of the real three-dimensional space, and the right side in FIG. 3 corresponds to a raster map of the virtual three-dimensional space. It should be noted that in practical applications, the size of the smallest real cell after rasterization in the real three-dimensional space may be the same as or different from the size of the smallest virtual cell after rasterization in the virtual three-dimensional space. A (on the upper surface in the left figure) in the left figure in FIG. 3 corresponds to the described target object, and B (on the upper surface in the right figure) in the right figure in FIG. 3 corresponds to an object in the virtual three-dimensional space to which the target object in the real three-dimensional space is mapped, for example, represented by a cursor, or represented by a cartoon character or cartoon image. Moreover, the target object in the left figure of FIG. 3 moves from A to C, i.e. moving from the cell where A is located to the cell where C is located, which corresponds to the target movement trajectory of the target object in the embodiments above; after mapping the target movement trajectory to the virtual three-dimensional space, correspondingly, the target object moves from B to C' in the right figure of FIG. 3, wherein C' indicates the target virtual interaction object above. In a case that the target movement trajectory (A→C) triggers the target interaction operation of the target virtual interaction object, for example, an operation on the target virtual interaction object may be a single-click or double-click or other modes, a picture corresponding to the target interaction operation is displayed and executed on the target augmented reality device. For example, response after confirmation may be performed on the target virtual interaction object, and in practical applications, an operator may also be prompted in manners such as sound, light or tactile sensation at the same time.

In some embodiments, the step that the target movement trajectory of the target object in the real three-dimensional space is acquired, includes: ranging information obtained by a target collection module performing ranging on the target object at each moment in a group of moments is acquired; the position of the target object in the real three-dimensional space at each moment is determined according to the ranging information acquired at each moment; and the position of the target object in the real three-dimensional space at each moment is fitted to form the target movement trajectory. For example, the target collection module can perform ranging on the target object at multiple moments within a period of time to obtain a group of ranging information, wherein the ranging information may be obtained according to multiple frames of images included in video data collected by the target collection module. Optionally, the ranging information of the target object may be acquired periodically at a predetermined cycle within a period of time, and then the position of the target object in the real three-dimensional space at each moment is determined. For example, for the real cells in the real three-dimensional space in FIG. 3, the target object may pass through multiple cells within a period of time, and the target movement trajectory of the target object may be obtained by fitting positions of the multiple cells to a curve. In the present embodiment, the target collection module may be one ranging module, and may also be multiple ranging modules. By the present embodiment, the objective of determining the target movement trajectory of the target object in the real three-dimensional space is achieved.

In some embodiments, the step that the position of the target object in the real three-dimensional space at each moment is determined according to the ranging information acquired at each moment, includes: the following operations are performed on the acquired ranging information at each moment, wherein when the following operations are performed, each moment is a current moment: when the target collection module is one ranging module and the ranging information acquired at the current moment represents a current distance between the target object and a preset mark point in the real three-dimensional space, the position of the target object in the real three-dimensional space at the current moment is determined according to the position of the preset mark point in the real three-dimensional space and the current distance represented by the ranging information; in a case that the target collection module includes multiple ranging modules, the ranging information acquired at the current moment includes multiple pieces of ranging information obtained by the multiple ranging modules respectively performing ranging on the target object at the current moment, and each piece of ranging information among the multiple pieces of ranging information represents the current distance between the target object and the preset mark point in the real three-dimensional space, multiple positions of the target object in the real three-dimensional space at the current moment are determined according to the position of the preset mark point in the real three-dimensional space and multiple current distances represented by the multiple pieces of ranging information; and the position of the target object in the real three-dimensional space at the current moment is determined according to the multiple positions of the target object in the real three-dimensional space at the current moment. In the present embodiment, when the target collection module is one ranging module and the ranging information acquired at the current moment represents the current distance between the target object and the preset mark point, the preset mark point may be a coordinate origin in the real three-dimensional space or a certain reference point in the real three-dimensional space, the position of the target object in the real three-dimensional space at the current moment can be determined according to the position of the preset mark point in the real three-dimensional space and the described current distance; when the target collection module includes multiple ranging modules, the ranging information acquired at the current moment includes multiple pieces of ranging information obtained by the multiple ranging modules performing ranging on the target object, and when each piece of ranging information represents the current distance between the target object and the preset mark point, the preset mark point may be a coordinate origin in the real three-dimensional space or a certain reference point in the real three-dimensional space, multiple positions of the target object in the real three-dimensional space at the current moment can be determined according to the position of the preset mark point in the real three-dimensional space and the multiple current distances represented by each piece of ranging information; and then the position of the target object in the real three-dimensional space at the current moment is determined according to the multiple positions of the target object in the real three-dimensional space. For example, in practical applications, average calculation may be performed on the multiple positions to determine a final position of the target object, or a weighted average algorithm may be performed on the multiple positions to determine the final position of the target object. By the present embodiment, the objective of determining the position of the target object in the real three-dimensional space at each moment is achieved.

In some embodiments, the step that the position of the target object in the real three-dimensional space at the current moment is determined according to the multiple positions of the target object in the real three-dimensional space at the current moment, includes: averaging is performed on three-dimensional coordinates of the multiple positions in the real three-dimensional space to obtain first target three-dimensional coordinates, and the position represented by the first target three-dimensional coordinates in the real three-dimensional space is determined as the position of the target object in the real three-dimensional space at the current moment; or weighted averaging is performed on the three-dimensional coordinates of the multiple positions in the real three-dimensional space to obtain second target three-dimensional coordinates, and the position represented by the second target three-dimensional coordinates in the real three-dimensional space is determined as the position of the target object in the real three-dimensional space at the current moment. In the present embodiment, the position of the target object in the real three-dimensional space at the current moment can be determined by using an average calculation method on multiple positions in the real three-dimensional space; or multiple positions in the real three-dimensional space are calculated by using a weighted average algorithm, so as to determine the position of the target object in the real three-dimensional space at the current moment. For example, when the target collection module includes multiple ranging modules, and for some application scenarios, if the optical ranging module is not applicable, the weighting coefficient of the optical ranging module part takes a very small value or takes zero; by the same reasoning, if the millimeter wave ranging module is not applicable to some application scenarios, the weighting coefficient corresponding to the module may be decreased correspondingly or the weighting coefficient corresponding to the module may be set to zero. In this way, ranging data of different ranging modules may be integrated flexibly regarding different application scenarios, thereby improving the reliability of the ranging data. By the present embodiment, multiple ranging modules are used to perform ranging on the target object, and a comprehensive calculation (such as the average calculation or the weighted average calculation) is performed on the multiple pieces of measured ranging information to determine the position of the target object, so that the purpose of improving the accuracy of determining the position of the target object can be achieved, thereby achieving the effect of reducing the space system error.

In some embodiments, before the step that the target augmented reality three-dimensional picture is displayed on the target augmented reality device, the method further includes: hardware resource information of the target collection module associated with the target augmented reality device and processing capability information of the target augmented reality device are acquired, wherein the target collection module is configured to perform ranging on the target object to obtain ranging information, wherein the ranging information is used for determining the target movement trajectory of the target object in the real three-dimensional space; and the real three-dimensional space is rasterized to obtain the group of real cells and the virtual three-dimensional space is rasterized to obtain the group of virtual cells according to the hardware resource information of the target collection module and the processing capability information of the target augmented reality device. In the present embodiment, the hardware resource information of the target collection module and the processing capability information of the target augmented reality device can be pre-acquired; then, the real three-dimensional space is rasterized and the virtual three-dimensional space is rasterized according to the hardware resource information of the target collection module and the processing capability information of the target augmented reality device. For example, in practical applications, the target collection module and/or the target augmented reality device, etc. can be initialized via software. For example, system processing modules such as CPU, GPU and the like may be initialized, and then a hardware scoring program is started to evaluate the hardware calculation capability, 3D display capability, current network operation capability and also image processing capability, etc. of the target collection module and/or the target augmented reality device, and a general score is calculated by integrating the network operation capability, the calculation capability, the image processing capability and the 3D display capability; that is, the hardware capabilities of the system are integrated, and then it is determined to adopt corresponding rasters to perform rasterization on the real three-dimensional space and perform rasterization on the virtual three-dimensional space. By the present embodiment, the purpose of determining a corresponding rasterization standard by combining the hardware capabilities in the system is achieved, and in this way, the purpose of matching the rasterization with the processing capabilities of the target collection module and the target augmented reality device can be achieved, thereby achieving the effect of increasing the operation efficiency and accuracy of the system.

In some embodiments, the step that the real three-dimensional space is rasterized to obtain the group of real cells and the virtual three-dimensional space is rasterized to obtain the group of virtual cells according to the hardware resource information of the target collection module and the processing capability information of the target augmented reality device, includes: the value of a target processing capability parameter is determined according to the hardware resource information of the target collection module and the processing capability information of the target augmented reality device; the real three-dimensional space is rasterized to obtain the group of real cells and the virtual three-dimensional space is rasterized to obtain the group of virtual cells according to a first cell size corresponding to the value of the target processing capability parameter, wherein the value of the target processing capability parameter is negatively correlated with the first cell size; or the real three-dimensional space is rasterized to obtain the group of real cells and the virtual three-dimensional space is rasterized to obtain the group of virtual cells according to a second cell size corresponding to a value range within which the value of the target processing capability parameter falls, wherein a boundary value of the value range within which the value of the target processing capability parameter falls is negatively correlated with the second cell size. In the present embodiment, the value of the target processing capability parameter is determined according to the hardware resource information of the target collection module and the processing capability information of the target augmented reality device. For example, a general score is calculated by integrating the current network operation capability, the calculation capability, the image processing capability and the 3D display capability, then a corresponding first cell size is set according to the value of the score, and the real three-dimensional space is rasterized and the virtual three-dimensional space is rasterized, so as to obtain the group of real cells and the group of virtual cells; wherein the value of the target processing capability parameter is negatively correlated with the first cell size, that is, the larger the value of the target processing capability parameter is, the smaller the value of the first cell size can be taken according to needs, so as to achieve the purpose of more refined rasters. Or a corresponding second cell size is set according to a value range of the target processing capability parameter, and then the real three-dimensional space is rasterized and the virtual three-dimensional space is rasterized. By the same reasoning, the boundary value of the value range is negatively correlated with the second cell size, that is, the larger the boundary value of the value range is, the smaller the value of the second cell size can be taken according to needs, so as to achieve the purpose of more refined rasters. By the present embodiment, the purpose of determining the unit raster size in rasterization according to the value of the target processing capacity parameter is achieved.

In some embodiments, the step that the real cell set through which the target movement trajectory passes is determined from the group of real cells, includes: the group of real cells are searched for cells at which positions in the target movement trajectory are located, to obtain the real cell set. In the present embodiment, the group of real cells are searched for cells at which positions in the target movement trajectory are located, to obtain the real cell set, that is, a real cell set through which the target movement trajectory passes is determined, and then, on the basis of the mapping relationship between the real three-dimensional space and the virtual three-dimensional space, the first virtual cell set through which a movement trajectory of a cursor (or other objects corresponding to the target object in the real space, such as a cartoon character or cartoon image) in the virtual three-dimensional space passes can be determined. According to the present embodiment, the objective of determining, in the real three-dimensional space, a real cell set through which the target movement trajectory passes is achieved, and therefore the objective of determining the movement trajectory of the cursor in the virtual three-dimensional space can be further achieved.

Figure 4:
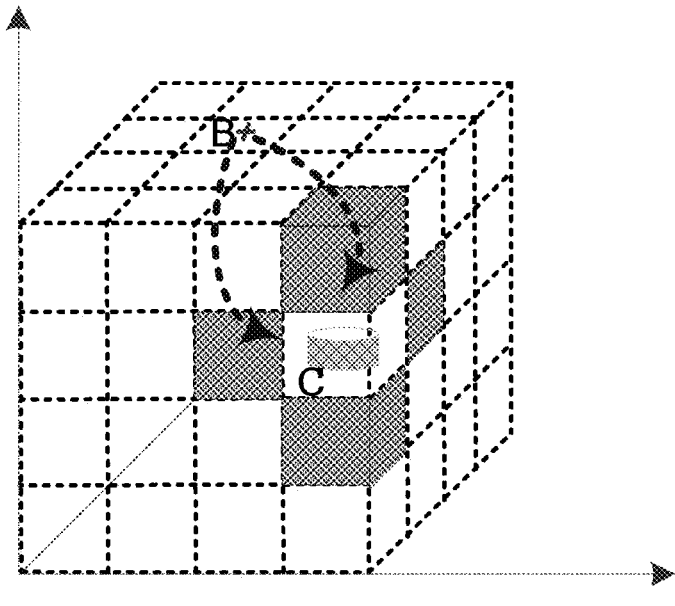
FIG. 4 is a schematic diagram of a response range of a target virtual interaction object according to embodiments of the present disclosure.

In some embodiments, the step that whether the target movement trajectory triggers the target interaction operation of the target virtual interaction object is determined according to the position relationship between the first virtual cell set and the second virtual cell set, includes: in a case that a target response range is set for the target virtual interaction object in the virtual three-dimensional space and the target response range includes a third virtual cell set in the virtual three-dimensional space, whether virtual cells in the first virtual cell set are located inside the third virtual cell set is detected, wherein in the virtual three-dimensional space, the second virtual cell set is located inside the third virtual cell set; upon detecting that a virtual cell subset in the first virtual cell set is located inside the third virtual cell set, whether the target movement trajectory triggers the target interaction operation of the target virtual interaction object is determined according to the position relationship between the virtual cell subset in the first virtual cell set and the second virtual cell set; or in a case that the target response range is not set for the target virtual interaction object in the virtual three-dimensional space, whether the target movement trajectory triggers the target interaction operation of the target virtual interaction object is determined according to the position relationship between the first virtual cell set and the second virtual cell set. In the present embodiment, when the target response range is set for the target virtual interaction object in the virtual three-dimensional space and the target response range includes the third virtual cell set in the virtual three-dimensional space, for example, the third virtual cell set includes multiple virtual cells of which the distance from the target virtual interaction object in the virtual three-dimensional space is a target threshold (for example, 1 virtual cell, or 5 virtual cells, or other values), and then whether virtual cells in the first virtual cell set are located inside the third virtual cell set is detected, and if it is detected that a virtual cell subset (e.g. one or more virtual cells) included in the first virtual cell set is located inside the third virtual cell set, whether the target movement trajectory triggers the target interaction operation of the target virtual interaction object is determined according to the position relationship between the virtual cell subset and the second virtual cell set. That is, by the present embodiment, a response area is set for the target virtual interaction object (such as an icon) in the virtual three-dimensional space, and only when the cursor moves to the response area, is the operation of the target object monitored, for example, a confirmation action or a button response; in this way, the problem of possible misoperation in actual operations can be avoided, thereby achieving the purpose of increasing the interaction efficiency. Optionally, if no target response range is set for the target virtual interaction object (such as an icon) in the virtual three-dimensional space, whether the target movement trajectory triggers the target interaction operation of the target virtual interaction object may be determined directly according to the position relationship between the first virtual cell set and the second virtual cell set. FIG. 4 is a schematic diagram of a response range of the target virtual interaction object according to embodiments of the present disclosure. In FIG. 4, B is a cursor moving along with the movement of the target object in the real three-dimensional space, C' represents the described target virtual interaction object, and the area of virtual cells in the shaded parts as shown in the figure corresponds to the described response area. In FIG. 4, an area including cells of which the distance from the target virtual interaction object is one virtual cell is taken as the response area. It should be noted that FIG. 4 is only an example, and in practical applications, other response ranges may be set according to requirements of different application scenarios. For example, an area including cells of which the distance from the target virtual interaction object is 5 or 10 virtual cells is taken as the response area. By the present embodiment, the purpose of determining whether the target movement trajectory triggers the target interaction operation of the target virtual interaction object according to the position relationship between the first virtual cell set and the second virtual cell set, is achieved.

In some embodiments, the step that whether the target movement trajectory triggers the target interaction operation of the target virtual interaction object is determined according to the position relationship between the virtual cell subset of the first virtual cell set and the second virtual cell set, includes: whether the virtual cell subset in the first virtual cell set is located in the second virtual cell set is judged; when it is judged that virtual cells located in the second virtual cell set exist in the virtual cell subset, it is determined that the target movement trajectory triggers the target interaction operation of the target virtual interaction object; or the number, of virtual cells of the virtual cell subset in the first virtual cell set, in the second virtual cell set is determined; and when the number, of virtual cells in the virtual cell subset, in the second virtual cell set is greater than or equal to a predetermined number threshold, it is determined that the target movement trajectory triggers the target interaction operation of the target virtual interaction object; or whether the virtual cell subset in the first virtual cell set is located in the second virtual cell set is judged; and when it is judged that virtual cells in the second virtual cell set exist in the virtual cell subset, and the retention duration, in the second virtual cell set, of the virtual cells in the virtual cell subset is greater than or equal to a predetermined duration threshold, it is determined that the target movement trajectory triggers the target interaction operation of the target virtual interaction object. In the present embodiment, by judging whether the virtual cell subset is located in the second virtual cell set, whether the target movement trajectory triggers the target interaction operation of the target virtual interaction object can be determined. For example, when it is judged that virtual cells in the second virtual cell set exist in the virtual cell subset, it is determined that the target movement trajectory triggers the target interaction operation of the target virtual interaction object. Optionally, by determining the number, of virtual cells of the virtual cell subset in the first virtual cell set, in the second virtual cell set, whether the target movement trajectory triggers the target interaction operation of the target virtual interaction object can be determined. For example, when it is determined that the number, of virtual cells in the virtual cell subset, in the second virtual cell set is greater than or equal to a predetermined number threshold (e.g. 2, 3 or other number), it is determined that the target movement trajectory triggers the target interaction operation of the target virtual interaction object. By the present embodiment, the problem of possible misoperation in actual operations can be avoided, thereby achieving the purpose of increasing the interaction efficiency. Optionally, when it is judged that virtual cells in the second virtual cell set exist in the virtual cell subset of the first virtual cell set, and the retention duration, in the second virtual cell set, of the virtual cells in the virtual cell subset is greater than or equal to the predetermined duration threshold, for example, when the cursor in the virtual three-dimensional space moves to the second virtual cell set in which the target virtual interaction object is located, and the retention duration of the cursor in the second virtual cell set is greater than or equal to the predetermined duration threshold (such as 1 s or 0.5 s or other durations), it can be determined that the target movement trajectory triggers the target interaction operation of the target virtual interaction object. By the present embodiment, whether the target movement trajectory triggers the target interaction operation of the target virtual interaction object can be determined by setting different modes, thereby achieving the purpose of flexibly setting different interaction operation modes according to different application scenarios, and achieving the effect of broadening the application range of the interaction method.

In some embodiments, the method further includes: log information of the target augmented reality device is searched for an interaction log between the target object and the target virtual interaction object; an anomalous interaction operation between the target object and the target virtual interaction object is determined according to the interaction log between the target object and the target virtual interaction object; and a trigger condition of the target interaction operation is adjusted according to the anomalous interaction operation. In the present embodiment, the interaction log between the target object and the target virtual interaction object is searched for, to determine an anomalous interaction operation which has occurred, and then the trigger condition of the target interaction operation is adjusted according to the anomalous interaction operation. For example, in actual applications, misoperations may be recorded so as to modify a mapping mode equation between the real three-dimensional space and the virtual three-dimensional space, thereby achieving a hierarchical optimization effect of complex control.

Obviously, the embodiments as described above are only some of the embodiments of the present disclosure, and are not all the embodiments. Hereinafter, the present disclosure will be further described in detail in combination with specific embodiments.

Figure 5:
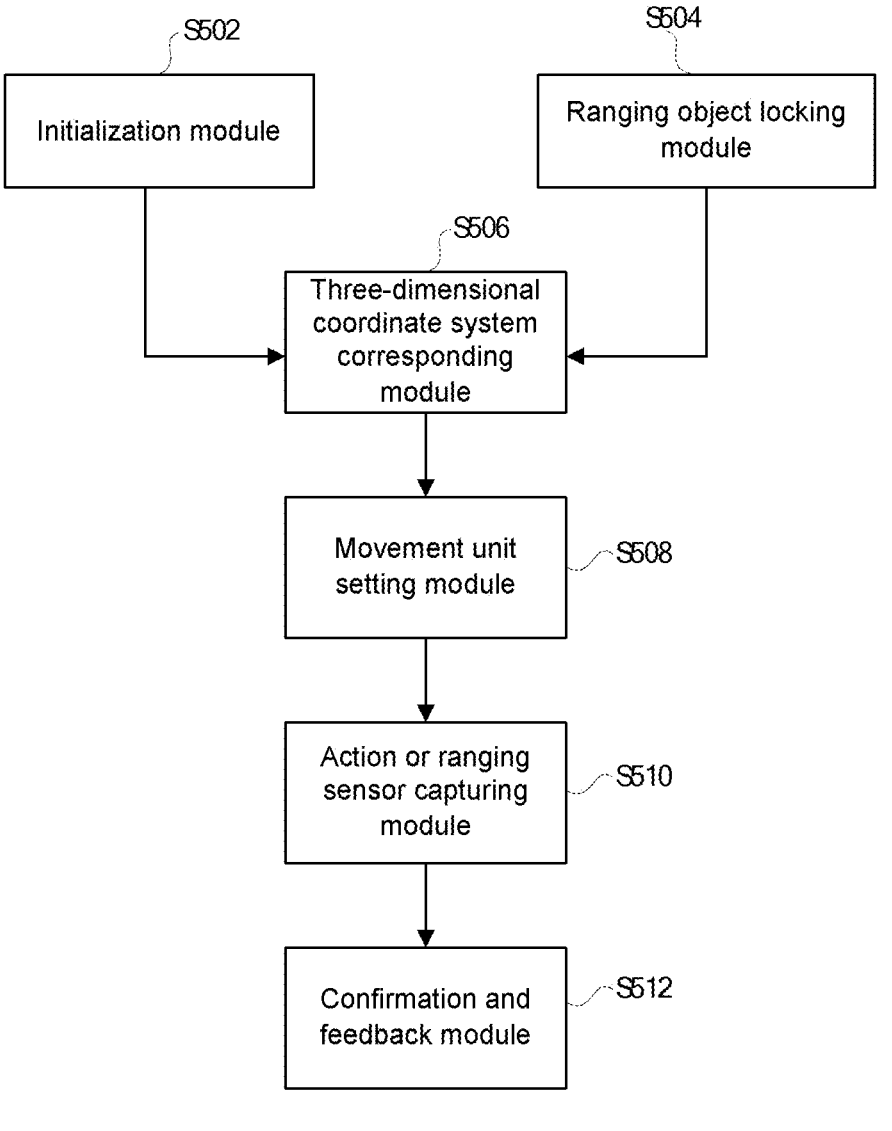
FIG. 5 is an overall flowchart of a method for interaction in a three-dimensional space according to some specific embodiments of the present disclosure.

FIG. 5 is an overall flowchart of a method for interaction in a three-dimensional space according to some specific embodiments of the present disclosure. As shown in FIG. 5, the flow includes the following steps:

S502, initialization is performed by using an initialization module, that is, initialization starting is performed on hardware included in the interaction system, for example, the hardware may include the target collection module and the target augmented reality device, etc.;

S504, a ranging object locking module is used to lock a ranging object (corresponding to the described target object in the real three-dimensional space), a ranging standard point serves as a tracking point for three-dimensional spatial perception, that is, the position of the standard point is locked and a movement trajectory of the standard point is obtained by ranging, etc., and when the target collection module includes multiple ranging modules, error averaging processing is performed on multiple groups of ranging data, namely, integrating is performed to obtain composite ranging data so as to achieve a better fitting degree with the reality;

S506, a three-dimensional coordinate system corresponding module is used to perform calculation on the composite ranging data, to average error of the three-dimensional coordinate system, and to perform fitting to control the interaction between a motion curve and a virtual three-dimensional display interface; and S508, a movement unit setting module sets a movement restricted area according to the capability of the system, that is, the movement restricted area is operated more appropriately in which manner specifically, and the movement restricted area can also be adjusted according to the specific operation of the user, for example, when controlling an icon confirmation action, a driving rule is applied, and in a drawing design operation, another driving rule is applied. Depending on different operation modes, the movement trajectories and user habits also differ. For example, taking icon confirmation as an embodiment, when a cursor approaches an icon in reality, in order to avoid a misoperation when the cursor approaches the icon (target), the icon (target) draws a response range (or a response area) in the three-dimensional space, and only when the cursor enters the response area, can a confirmation action or a button response be monitored, thereby increasing the confirmation efficiency. Since the operation is performed in a three-dimensional real environment, scenarios used by the user facilitate recognition, such that refining control modes according to different usage scenarios becomes much easier than a mouse-like operation, thereby improving the user experience more intelligently; and the movement unit setting herein is not linear setting as that of mouse operation, but is an intelligent setting containing adaptation action recognition, so as to adapt to the best interaction experiences of different application scenarios.

S510, an action or ranging sensor capturing module further captures the action of the target object, for example, taking chart confirmation as an example, when the movement of the target object (such as a finger) is mapped to a virtual three-dimensional space and it shows that the cursor has contacted a virtual interaction object (or the described response area), the action of the target object is further captured to determine whether to respond to a confirmation action, which can increase the confirmation efficiency; and S512, a confirmation and feedback module controls final confirmation of the movement, and the execution process may be executed in a device at a hand-held end, and may also be a separate gesture operation.

Figure 6:
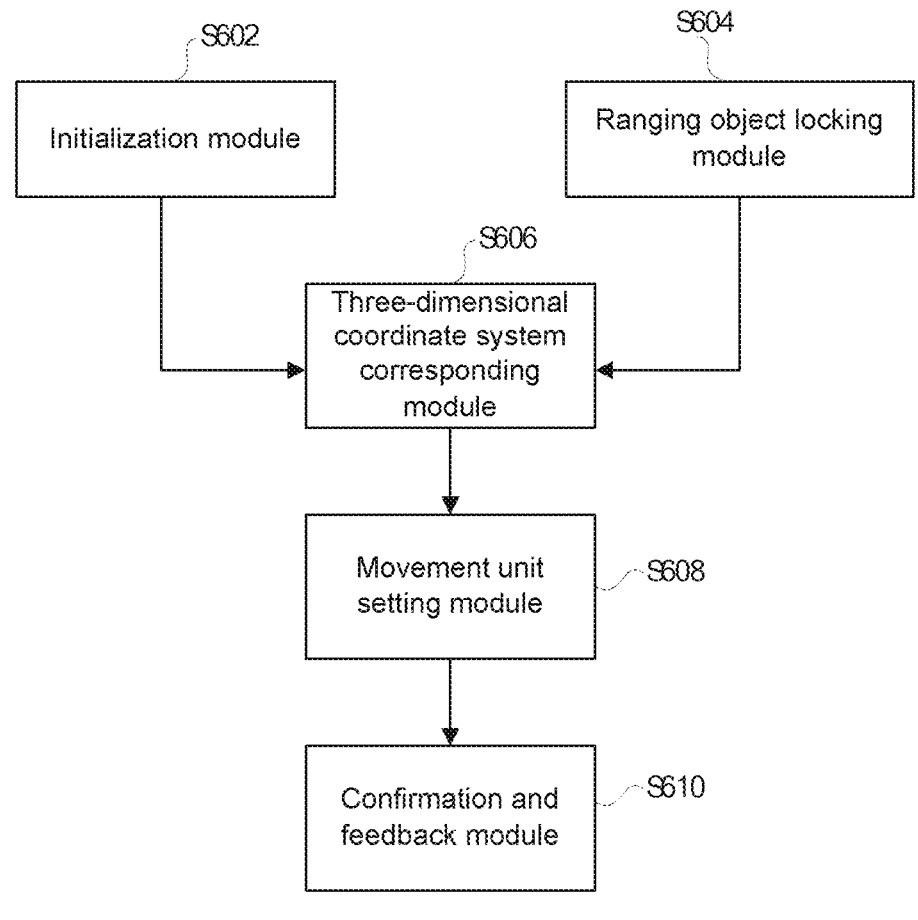
FIG. 6 is an overall flowchart of a method for interaction in a three-dimensional space according to some other specific embodiments of the present disclosure.

Optionally, for some application scenarios in which the requirement for the accuracy of confirming whether to trigger an interaction operation is not very high, the process can be implemented according to the flow as shown in FIG. 6. FIG. 6 is an overall flowchart of a method for interaction in a three-dimensional space according to some other specific embodiments of the present disclosure. A system including a UWB module, a millimeter wave module and an optical compound ranging module is taken as an example, the system includes an initialization module, a ranging object locking module, a three-dimensional coordinate system corresponding module, a movement unit setting module and a confirmation and feedback module. Compared with the flow in FIG. 5, this flow omits the step in S510. For example, in practical applications, when the movement of the target object (such as a finger) is mapped to the virtual three-dimensional space and it shows that the cursor has touched the virtual interaction object (or the described response area), the target interaction operation is considered to be triggered, and the other steps are respectively the same as those in FIG. 5, and specifically include the following steps:

S602, initialization is performed by using an initialization module, that is, initialization starting is performed on hardware included in the interaction system, for example, the hardware may include the target collection module and the target augmented reality device, etc.;

S604, a ranging object locking module is used to lock a ranging object (corresponding to the described target object in the real three-dimensional space), a ranging standard point serves as a tracking point for three-dimensional spatial perception, that is, the position of the standard point is locked and a movement trajectory of the standard point is obtained by ranging, etc., and when the target collection module includes multiple ranging modules, error averaging processing is performed on multiple groups of ranging data, namely, integrating is performed to obtain composite ranging data so as to achieve a better fitting degree with the reality;

S606, a three-dimensional coordinate system corresponding module is used to perform calculation on the composite ranging data, to average error of the three-dimensional coordinate system, and to perform fitting to control the interaction between a motion curve and a virtual three-dimensional display interface; and S608, a movement unit setting module sets a movement restricted area according to the capability of the system, that is, the movement restricted area is operated more appropriately in which manner specifically, and the movement restricted area can also be adjusted according to the specific operation of the user, for example, when controlling an icon confirmation action, a driving rule is applied, and in a drawing design operation, another driving rule is applied. Depending on different operation modes, the movement trajectories and user habits also differ. For example, taking icon confirmation as an embodiment, when a cursor approaches an icon in reality, in order to avoid a misoperation when the cursor approaches the icon (target), the icon (target) draws a response range (or a response area) in the three-dimensional space, and only when the cursor enters the response area, can a confirmation action or a button response be monitored, thereby increasing the confirmation efficiency. Since the operation is performed in a three-dimensional real environment, scenarios used by the user facilitate recognition, such that refining control modes according to different usage scenarios becomes much easier than a mouse-like operation, thereby improving the user experience more intelligently; and the movement unit setting herein is not linear setting as that of mouse operation, but is an intelligent setting containing adaptation action recognition, so as to adapt to the best interaction experiences of different application scenarios.

S610, a confirmation and feedback module controls final confirmation of the movement, and the execution process may be executed in a device at a hand-held end, and may also be a separate gesture operation.

Figure 7:
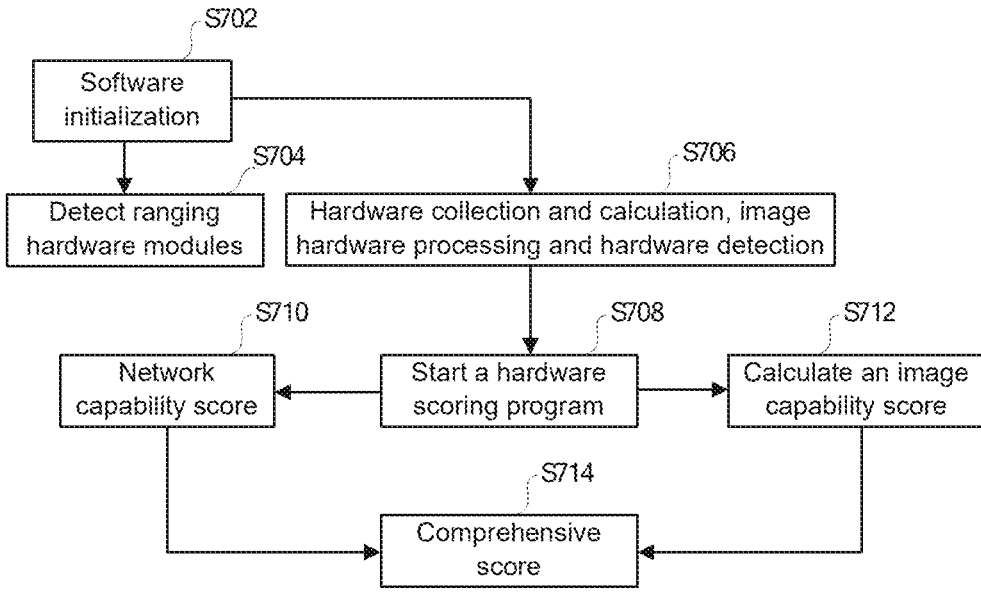
FIG. 7 is a workflow diagram of an initialization module according to specific embodiments of the present disclosure.

Hereinafter, the execution process of different modules involved in the steps above is illustrated:

FIG. 7 is a workflow diagram of the initialization module according to specific embodiments of the present disclosure. The initialization module is a first module for starting the present system, and the main functions thereof are to identify hardware devices participating in three-dimensional collection, to identify the hardware calculation capability of the acquisition device and the three-dimensional reality capability of a real device, and to integrate the capabilities achieved by the hardware. The flow includes the following steps:

S702, software initialization;

S704, ranging hardware modules are detected, taking a composite ranging system including three ranging modules, i.e. a UWB module, a millimeter wave module and an optical ranging module as an example, when detecting hardware modules, the three ranging modules will be detected and initialization starting of the hardware is performed;

S706, hardware collection and calculation, image hardware processing and hardware detection, that is, other hardware modules are detected and initialization starting of other hardware is performed;

the three modules can be respectively used to perform ranging on a marking point, a corresponding three-dimensional coordinate system is established, and relative positions of the three-dimensional coordinate system are averaged according to test data, so as to reduce the space system error;

S708, a hardware scoring program is started, to evaluate the network operation capability, the hardware calculation capability, the image processing capability and the 3D display capability, etc.;

S710, a network capability score is obtained;

S712, an image capability score is obtained by calculation; and

S714, comprehensive score, that is, the current network operation capability, calculation capability, image processing capability and 3D display capability are integrated to calculate a general score, and then a corresponding processing raster is mapped (the concept of raster in 2D, similar to the concept of a unit cube in a three-dimensional space).

Figure 8:
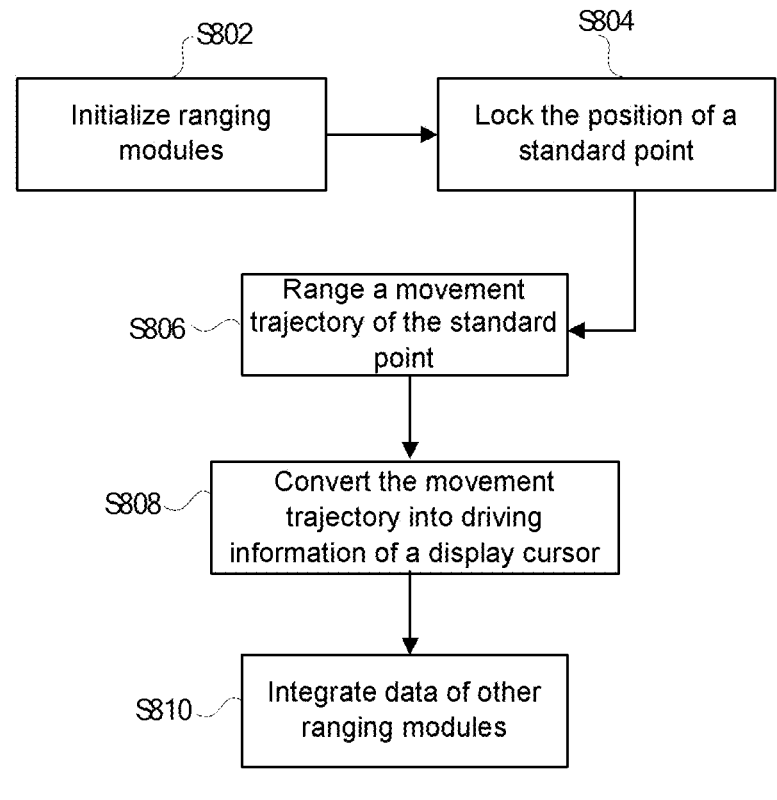
FIG. 8 is a workflow diagram of a ranging object locking module according to specific embodiments of the present disclosure.

FIG. 8 is a workflow diagram of the ranging object locking module according to specific embodiments of the present disclosure. This module is mainly regarding a ranging standard point as a three-dimensional space perception tracking point, in which the standard point may be an optical label or a UWB label or a millimeter wave forwarding beacon point (not limited to the several forms) or a composite product of the several labels, and mainly provides an accurate standard point for three-dimensional ranging. The flow includes the following steps:

S802, ranging modules (corresponding to the described ranging modules) are initialized;

S804, the position of the standard point is locked;

S806, the movement trajectory of the standard point is ranged;

S808, the movement trajectory is converted into driving information of a display cursor; and S810, data of other ranging modules is integrated, and when the system includes multiple ranging modules, in this step, ranging data of the multiple ranging modules can be integrated, so that tracking of the ranging standard point can be more accurate, and a more accurate tracking standard point trajectory can be obtained.

Operations of the ranging object locking module are similar to calibrating a tracking point by waving a hand or a ranging card in a kinect operation, except that in the present embodiment, an optical label or a UWB label or a millimeter wave forwarding beacon point is used, so that the tracking is more accurate; and the trajectory of the standard point can be tracked well without optical shape recognition, and various ranging data can be subjected to error averaging processing, thereby achieving the effect of a better fitting degree with the reality.

Figure 9:
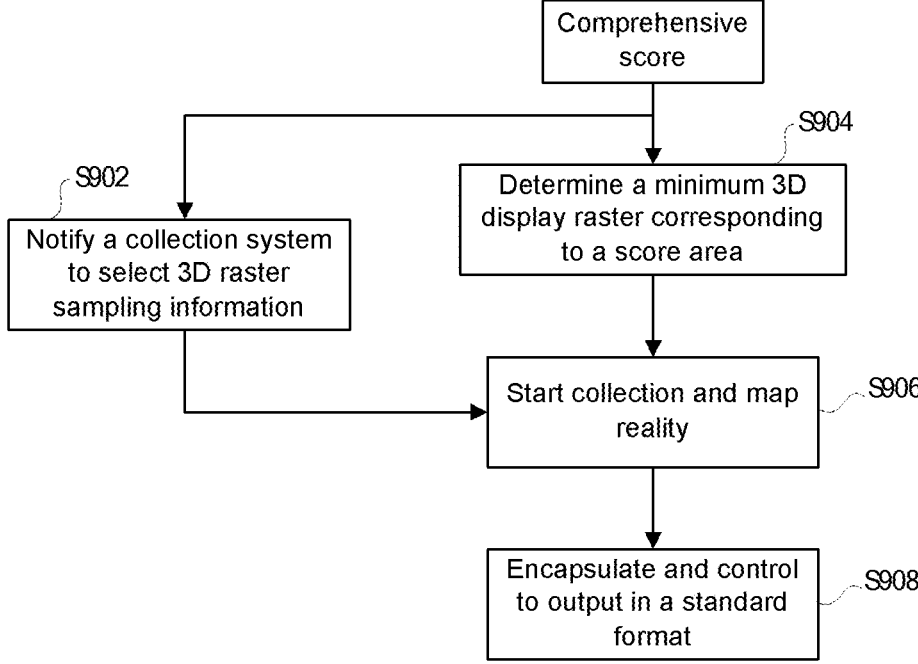
FIG. 9 is a workflow diagram of a three-dimensional coordinate system corresponding module according to specific embodiments of the present disclosure.

FIG. 9 is a workflow diagram of the three-dimensional coordinate system corresponding module according to specific embodiments of the present disclosure. The three-dimensional coordinate system corresponding module mainly performs corresponding calculation on the composite ranging data, averages the error of the three-dimensional coordinate system, and performs fitting to control the interaction between a motion curve and a display interface. The flow includes the following steps:

S902, according to the comprehensive score obtained in S714 in the workflow of the initialization module, a collection system is notified to select 3D raster sampling information, that is, the 3D raster sampling information is determined on the basis of the hardware capability of the collection module;

S904, a minimum 3D display raster corresponding to a score area is determined, that is, a minimum display raster unit corresponding to the score area is determined, i.e. a minimum raster size that can be displayed;

S906, collection is started and reality is mapped, that is, a ranging result of the real three-dimensional space is mapped to the virtual three-dimensional space while ranging information is collected; and S908, the ranging result of the real three-dimensional space is encapsulated, to output data in a standard format.

In the described steps, the format setting of three-dimensional reality is completed and a unit processing raster (the concept of raster in 2D, similar to the concept of a unit cube in a three-dimensional space) is controlled, thereby completing the operations and feedback scenarios of real-time movement and three-dimensional virtual reality.

Figure 10:
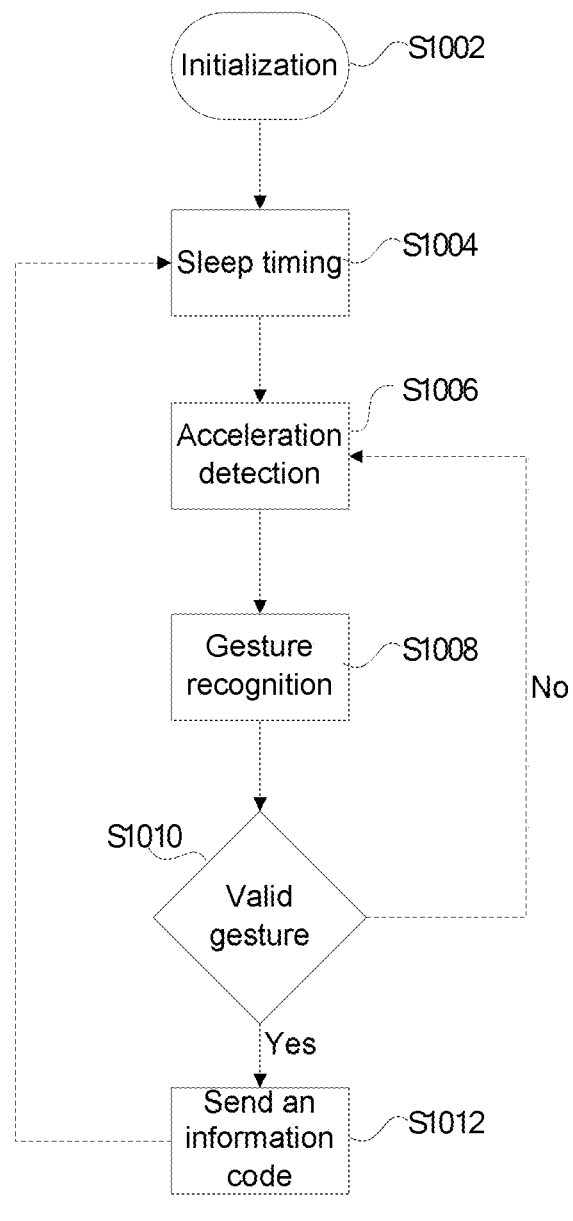
FIG. 10 is an exemplary working diagram of a confirmation and feedback module according to some specific embodiments of the present disclosure.

Hereinafter, a confirmation process of the confirmation and feedback module in step S512 or step S610 is described. FIG. 10 is an exemplary working diagram of the confirmation and feedback module according to some specific embodiments of the present disclosure. This example takes a separate gesture operation as an example, and the process includes the following steps:

S1002, initialization of modules;

S1004, the modules enter a sleep timing state;

S1006, acceleration detection is performed, that is, the acceleration of the movement of the target object (such as a finger) is detected;

S1008, gesture recognition is performed;

S1010, whether the gesture is a valid gesture is judged; and

S1012, when the judgment result is that the gesture is a valid gesture, an information code is sent, that is, the gesture operation is confirmed, and then a sleep timing state is entered; and when the judgment result is no, that is, when the gesture is not a valid gesture, acceleration detection of the gesture action continues.

Figure 11:
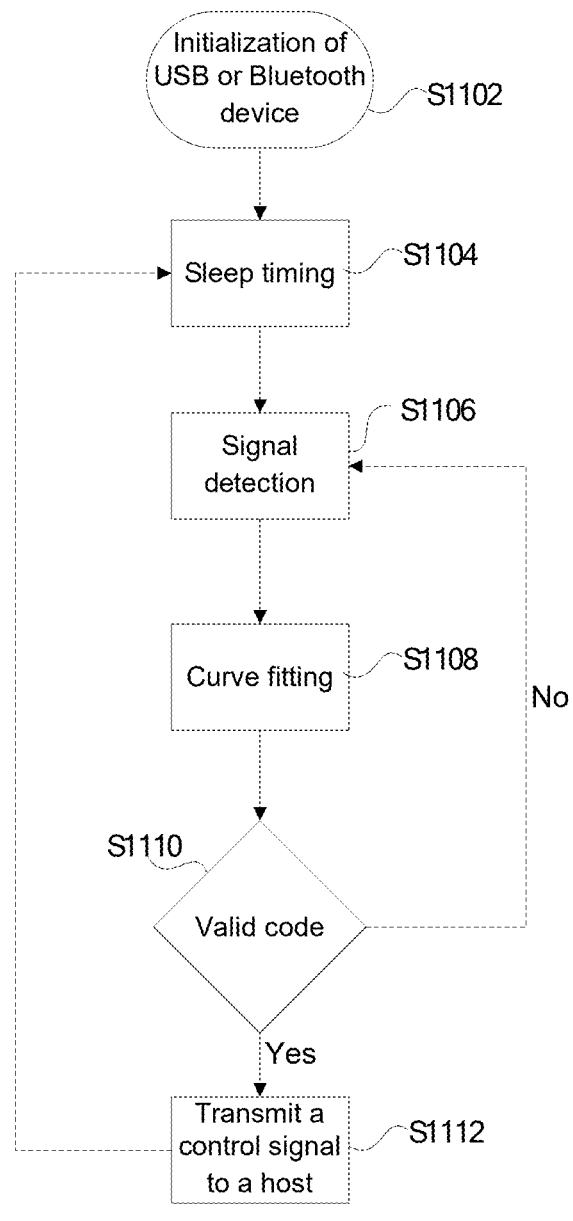
FIG. 11 is an exemplary working diagram of a confirmation and feedback module according to some other specific embodiments of the present disclosure.

FIG. 11 is an exemplary working diagram of the confirmation and feedback module according to some other specific embodiments of the present disclosure. This example takes a device at a handheld end executing confirmation as an example, and the process includes the following steps:

S1102, initialization of modules;

S1104, the modules enter a sleep timing state;

S1106, signal detection is performed to detect an operation action;

S1108, fitting is performed to obtain a curve of the operation action;

S1110, whether a code is a valid code is judged; and

S1112, when the judgment result is yes, a control signal is transmitted to a host, and then a sleep timing state is entered; and when the judgment result is no, that is, when the operation action is invalid, signal detection continues.

In the described embodiments of the present disclosure, an operation on the cursor (prompt point) is a feedback operation under three-dimensional sampling data. According to the embodiments of the present disclosure, after the system is started, it is necessary to perform initialization and recognition of ranging hardware in a real scenario and matching of three-dimensional picture capability in real operations, which is different from homogenization of a mouse operation interface in the existing backbone technology. In the embodiments of the present disclosure, after initialization, software will perform unit rasterization on the displayed three-dimensional space (cubes similar to pixels), and uses these unit rasters as a minimum cursor (prompt point) running unit. However, such rasterization depends on the sampling capability of the collection device and the processing capability of the display device, and the system performs a balance calculation regarding this by means of the movement unit setting module. In the embodiments of the present disclosure, in order to avoid a misoperation when the cursor approaches the icon (target), the icon (target) draws a response range in the three-dimensional space, and only when the cursor enters the response area, can a confirmation action or a button response be monitored, thereby increasing the confirmation efficiency. The confirmation and feedback module prompts an operator in time by using devices such as sound, light or tactile sensation devices according to the response of a picture, and records misoperations so as to modify the mapping mode equation, thereby achieving a hierarchical optimization effect of complex control. In addition, in the embodiments of the present disclosure, as a three-dimensional space perception tracking point, the standard point may be an optical label or a UWB label or a millimeter wave forwarding beacon point (not limited to the several forms) or a composite product of the several labels, and mainly provides an accurate standard point for three-dimensional ranging; and a control trajectory is mapped by the movement trajectory of the standard point in the three-dimensional space.

In the related art, the Microsoft's kinect system solves a mapping interaction problem between a real space and a virtual reality space; however, the resolution and interaction of cameras are operated on a 2D interface, and thus the confirmation speed is slow, refined operations cannot be performed, and a feedback mechanism for complex application scenarios is lacking. However, compared with the related art, the present disclosure remedies drawbacks of the kinect system, relates to space mapping interaction based on high-precision three-dimensional ranging, and uses a more advanced ranging and angle-measurement technology, for example (UWB, millimeter wave, etc.) to establish standard mapping between virtual and real spaces. On this basis, an interaction manner of achieving confirmation by using a hand movement tracking or peripheral apparatus solves the problem of interaction efficiency. The present disclosure relates to an interaction system allowing for mouse-like refined operations in a three-dimensional space.

By the embodiments of the present disclosure, on the basis of an AR (VR) interaction mode corresponding to a high-precision coordinate system, compared with the current kinect system, a virtual reality coordinate system is mapped by using hardware collecting three-dimensional data, and kinect is to synthesize a three-dimensional system by using an algorithm in a binocular (or multi-ocular) system. The interaction mode of the embodiments of the present disclosure is based on a coordinate system corresponding to high precision. Compared with a three-dimensional system constructed by a single (binocular system) of kinect in the related art, this system has higher precision, and a confirmation interface is confirmation in a three-dimensional space rather than displacement confirmation in a 2D plane. Therefore, the present disclosure has great advantages in terms of timeliness and accuracy of mapping to virtual reality. In addition, from the perspective of experience, the interaction manner of the embodiments of the present disclosure can achieve more realistic operation experiences, such as icon double-clicking, action approaching and touch control, etc. in 3D scenarios. The interaction manner also has a higher improvement in confirmation speed and confirmation accuracy. It is an interaction manner in which an operating system upgrades after precise improvement of a 3D collection system. In this implementation process, the program is highly dependent on three-dimensional space data measured in real time, and a measurement and calculation refinement unit (the concept of raster in 2D, similar to the concept of a unit cube in a three-dimensional space) is adjusted according to the proximity degree between the action and the target, so as to feed back a more refined operation of a hand (a handle or a sensor) approaching the target.

From the description of the described embodiments, a person skilled in the art would have been able to clearly understand that the methods in the described embodiments may be implemented by using software and necessary general hardware platforms, and of course may also be implemented using hardware, but in many cases, the former is a better embodiment. On the basis of such understanding, the portion of the technical solutions of the present disclosure that contributes in essence or contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to execute the methods as described in various embodiments of the present disclosure.

The present embodiment further provides an apparatus for interaction in a three-dimensional space, the apparatus is configured to implement the described embodiments and preferred embodiments, and what has been described will not be repeated again. As used below, the term "module" may implement a combination of software and/or hardware of predetermined functions. Although the apparatus described in the following embodiments is preferably implemented in software, implementation in hardware or a combination of software and hardware is also possible and could have been conceived.

Figure 12:
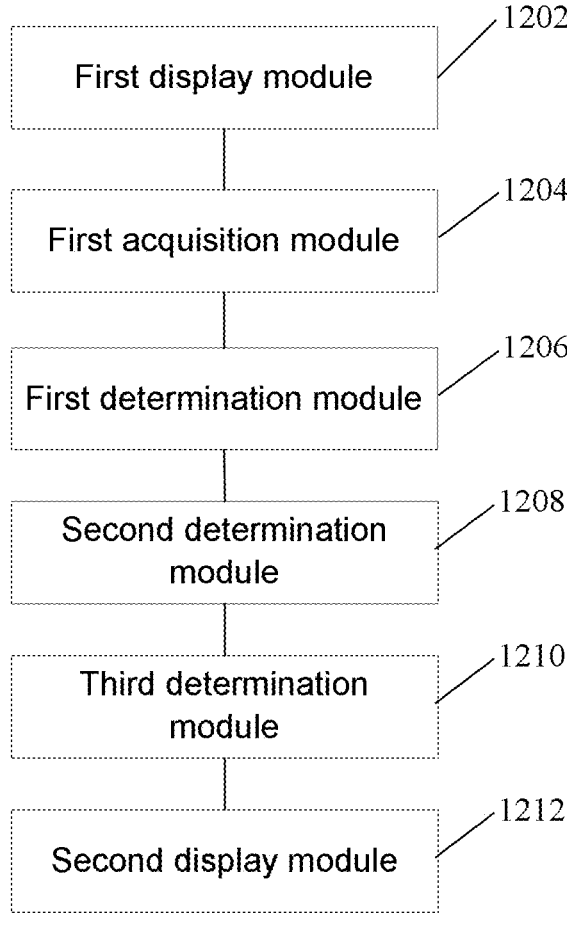
FIG. 12 is a structural block diagram of an apparatus for interaction in a three-dimensional space according to embodiments of the present disclosure.

FIG. 12 is a structural block diagram of an apparatus for interaction in a three-dimensional space according to embodiments of the present disclosure. As shown in FIG. 12, the apparatus includes:

a first display module 1202, configured to display a target augmented reality three-dimensional picture on a target augmented reality device, and display a target virtual interaction object in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells;

a first acquisition module 1204, configured to acquire, when identifying a target object in the real three-dimensional space, a target movement trajectory of the target object in the real three-dimensional space;

is a first determination module 1206, configured to determine, from the group of real cells, a real cell set through which the target movement trajectory passes;

a second determination module 1208, configured to determine, from the group of virtual cells, a passing first virtual cell set corresponding to the passing real cell set according to the mapping relationship between the group of real cells and the group of virtual cells;

a third determination module 1210, configured to determine, according to the position relationship between the first virtual cell set and a second virtual cell set, whether the target movement trajectory triggers a target interaction operation of the target virtual interaction object, wherein the second virtual cell set includes virtual cells occupied by the target virtual interaction object in the group of virtual cells; and and a second display module 1212, configured to display a picture corresponding to the target interaction operation on the target augmented reality device in a case that the target movement trajectory triggers the target interaction operation of the target virtual interaction object.

In some embodiments, the acquisition module 1204 includes: a first acquisition unit, configured to acquire ranging information obtained by a target collection module performing ranging on the target object at each moment in a group of moments; a first determination unit, configured to determine the position of the target object in the real three-dimensional space at each moment according to the ranging information acquired at each moment; and a fitting unit, configured to fit the position of the target object in the real three-dimensional space at each moment to form the target movement trajectory.

In some embodiments, the first determination unit includes: an execution sub-unit, configured to perform the following operations on the acquired ranging information at each moment, wherein when the following operations are performed, each moment is a current moment: when the target collection module is one ranging module and the ranging information acquired at the current moment represents a current distance between the target object and a preset mark point in the real three-dimensional space, the position of the target object in the real three-dimensional space at the current moment is determined according to the position of the preset mark point in the real three-dimensional space and the current distance represented by the ranging information; in a case that the target collection module includes multiple ranging modules, the ranging information acquired at the current moment includes multiple pieces of ranging information obtained by the multiple ranging modules respectively performing ranging on the target object at the current moment, and each piece of ranging information among the multiple pieces of ranging information represents the current distance between the target object and the preset mark point in the real three-dimensional space, multiple positions of the target object in the real three-dimensional space at the current moment are determined according to the position of the preset mark point in the real three-dimensional space and multiple current distances represented by the multiple pieces of ranging information; and the position of the target object in the real three-dimensional space at the current moment is determined according to the multiple positions of the target object in the real three-dimensional space at the current moment.

In some embodiments, the execution sub-unit may determine the position of the target object in the real three-dimensional space at the current moment by the following manners: averaging is performed on three-dimensional coordinates of the multiple positions in the real three-dimensional space to obtain first target three-dimensional coordinates, and the position represented by the first target three-dimensional coordinates in the real three-dimensional space is determined as the position of the target object in the real three-dimensional space at the current moment; or weighted averaging is performed on the three-dimensional coordinates of the multiple positions in the real three-dimensional space to obtain second target three-dimensional coordinates, and the position represented by the second target three-dimensional coordinates in the real three-dimensional space is determined as the position of the target object in the real three-dimensional space at the current moment.

In some embodiments, the apparatus further includes: a second acquisition module, configured to acquire hardware resource information of the target collection module associated with the target augmented reality device and processing capability information of the target augmented reality device before displaying the target augmented reality three-dimensional picture on the target augmented reality device; wherein the target collection module is configured to perform ranging on the target object to obtain ranging information, wherein the ranging information is used for determining the target movement trajectory of the target object in the real three-dimensional space; and a rasterization module, configured to rasterize the real three-dimensional space to obtain the group of real cells and rasterize the virtual three-dimensional space to obtain the group of virtual cells according to the hardware resource information of the target collection module and the processing capability information of the target augmented reality device.

In some embodiments, the rasterization module includes: a second determination unit, configured to determine the value of a target processing capability parameter according to the hardware resource information of the target collection module and the processing capability information of the target augmented reality device; a first rasterization unit, configured to rasterize the real three-dimensional space to obtain the group of real cells and rasterize the virtual three-dimensional space to obtain the group of virtual cells according to a first cell size corresponding to the value of the target processing capability parameter, wherein the value of the target processing capability parameter is negatively correlated with the first cell size; or a second rasterization unit, configured to rasterize the real three-dimensional space to obtain the group of real cells and rasterize the virtual three-dimensional space to obtain the group of virtual cells according to a second cell size corresponding to a value range within which the value of the target processing capability parameter falls, wherein a boundary value of the value range within which the value of the target processing capability parameter falls is negatively correlated with the second cell size.

In some embodiments, the first determination module 1206 includes: a searching unit, configured to search the group of real cells for cells at which positions in the target movement trajectory are located, to obtain the real cell set.

In some embodiments, the third determination module 1210 includes: a first detection unit, configured to detect, in a case that a target response range is set for the target virtual interaction object in the virtual three-dimensional space and the target response range includes a third virtual cell set in the virtual three-dimensional space, whether virtual cells in the first virtual cell set are located inside the third virtual cell set, wherein in the virtual three-dimensional space, the second virtual cell set is located inside the third virtual cell set; a third determination unit, configured to determine, upon detecting that a virtual cell subset in the first virtual cell set is located inside the third virtual cell set, whether the target movement trajectory triggers the target interaction operation of the target virtual interaction object according to the position relationship between the virtual cell subset in the first virtual cell set and the second virtual cell set; or a fourth determination unit configured to determine, in a case that the target response range is not set for the target virtual interaction object in the virtual three-dimensional space, whether the target movement trajectory triggers the target interaction operation of the target virtual interaction object according to the position relationship between the first virtual cell set and the second virtual cell set.

In some embodiments, the third determination unit includes: a first judgment sub-unit, configured to judge whether the virtual cell subset in the first virtual cell set is located in the second virtual cell set; a first determination sub-unit, configured to determine, when it is judged that virtual cells located in the second virtual cell set exist in the virtual cell subset, that the target movement trajectory triggers the target interaction operation of the target virtual interaction object; or a second determination sub-unit, configured to determine the number, of virtual cells of the virtual cell subset in the first virtual cell set, in the second virtual cell set; a third determination sub-unit, configured to determine, when the number, of virtual cells in the virtual cell subset, in the second virtual cell set is greater than or equal to a predetermined number threshold, that the target movement trajectory triggers the target interaction operation of the target virtual interaction object; or a second judgment sub-unit, configured to judge whether the virtual cell subset in the first virtual cell set is located in the second virtual cell set; and a fourth determination sub-unit, configured to determine, when it is judged that virtual cells in the second virtual cell set exist in the virtual cell subset and the retention duration, in the second virtual cell set, of the virtual cells in the virtual cell subset is greater than or equal to a predetermined duration threshold, that the target movement trajectory triggers the target interaction operation of the target virtual interaction object.

In some embodiments, the apparatus further includes: a searching module, configured to search log information of the target augmented reality device for an interaction log between the target object and the target virtual interaction object; a fourth determination module, configured to determine an anomalous interaction operation between the target object and the target virtual interaction object according to the interaction log between the target object and the target virtual interaction object; and an adjustment module, configured to adjust a trigger condition of the target interaction operation according to the anomalous interaction operation.

It should be noted that the described modules may be implemented by software or hardware. The latter may be implemented in the following manner, but is not limited thereto: all the described modules are located in the same processor; or all the modules are located in different processors in any arbitrary combination manner.

Embodiments of the present disclosure further provide a computer-readable storage medium, the computer-readable storage medium storing a computer program, wherein the computer program is configured to execute the steps in any one of the method embodiments above when run by a processor.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, including a memory and a processor; wherein the memory stores a computer program, and the processor is configured to run the computer program to execute the steps in any one of the method embodiments above.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the embodiments and exemplary embodiments, and thus they will not be repeated again in the present embodiment.

It is apparent that a person skilled in the art shall understand that all of the described modules or steps in the present disclosure may be implemented by using a general computation apparatus, may be centralized on a single computation apparatus or may be distributed on a network composed of multiple computation apparatuses, and may be implemented by using executable program codes of the computation apparatus. Thus, the described modules or steps may be stored in a storage apparatus and executed by the computation apparatus. In some cases, the shown or described steps may be executed in a sequence different from that shown herein, or they are manufactured into integrated circuit modules, or multiple modules or steps therein are manufactured into a single integrated circuit module. Thus, the present disclosure is not limited to any specific hardware and software combinations.

The content above merely relates to preferred embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

What is claimed is:

1. A method for interaction in a three-dimensional space, comprising:

displaying a target augmented reality three-dimensional picture on a target augmented reality device, and displaying a target virtual interaction object in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells;

acquiring, when identifying a target object in the real three-dimensional space, a target movement trajectory of the target object in the real three-dimensional space;

determining, from the group of real cells, a real cell set through which the target movement trajectory passes;

determining, from the group of virtual cells, a passing first virtual cell set corresponding to the passing real cell set according to the mapping relationship between the group of real cells and the group of virtual cells;

determining, according to the position relationship between the first virtual cell set and a second virtual cell set, whether the target movement trajectory triggers a target interaction operation of the target virtual interaction object, wherein the second virtual cell set comprises virtual cells occupied by the target virtual interaction object in the group of virtual cells; and displaying a picture corresponding to the target interaction operation on the target augmented reality device in a case that the target movement trajectory triggers the target interaction operation of the target virtual interaction object.

2. The method according to claim 1, wherein acquiring the target movement trajectory of the target object in the real three-dimensional space comprises:

acquiring ranging information obtained by a target collection module performing ranging on the target object at each moment in a group of moments;

determining the position of the target object in the real three-dimensional space at each moment according to the ranging information acquired at each moment; and fitting the position of the target object in the real three-dimensional space at each moment to form the target movement trajectory.

3. The method according to claim 2, wherein determining the position of the target object in the real three-dimensional space at each moment according to the ranging information acquired at each moment, comprises:

performing the following operations on the acquired ranging information at each moment, wherein when the following operations are performed, each moment is a current moment:

when the target collection module is one ranging module and the ranging information acquired at the current moment represents a current distance between the target object and a preset mark point in the real three-dimensional space, determining the position of the target object in the real three-dimensional space at the current moment according to the position of the preset mark point in the real three-dimensional space and the current distance represented by the ranging information;

in a case that the target collection module comprises multiple ranging modules, the ranging information acquired at the current moment comprises multiple pieces of ranging information obtained by the multiple ranging modules respectively performing ranging on the target object at the current moment, and each piece of ranging information among the multiple pieces of ranging information represents the current distance between the target object and the preset mark point in the real three-dimensional space, determining multiple positions of the target object in the real three-dimensional space at the current moment according to the position of the preset mark point in the real three-dimensional space and multiple current distances represented by the multiple pieces of ranging information; and determining the position of the target object in the real three-dimensional space at the current moment according to the multiple positions of the target object in the real three-dimensional space at the current moment.

4. The method according to claim 3, wherein determining the position of the target object in the real three-dimensional space at the current moment according to the multiple positions of the target object in the real three-dimensional space at the current moment, comprises:

performing averaging on three-dimensional coordinates of the multiple positions in the real three-dimensional space to obtain first target three-dimensional coordinates, and determining the position represented by the first target three-dimensional coordinates in the real three-dimensional space as the position of the target object in the real three-dimensional space at the current moment; or performing weighted averaging on the three-dimensional coordinates of the multiple positions in the real three-dimensional space to obtain second target three-dimensional coordinates, and determining the position represented by the second target three-dimensional coordinates in the real three-dimensional space as the position of the target object in the real three-dimensional space at the current moment.

5. The method according to claim 1, wherein before displaying the target augmented reality three-dimensional picture on the target augmented reality device, the method further comprises:

acquiring hardware resource information of a target collection module associated with the target augmented reality device and processing capability information of the target augmented reality device, wherein the target collection module is configured to perform ranging on the target object to obtain ranging information, wherein the ranging information is used for determining the target movement trajectory of the target object in the real three-dimensional space; and rasterizing the real three-dimensional space to obtain the group of real cells and rasterizing the virtual three-dimensional space to obtain the group of virtual cells according to the hardware resource information of the target collection module and the processing capability information of the target augmented reality device.

6. The method according to claim 5, wherein rasterizing the real three-dimensional space to obtain the group of real cells and rasterizing the virtual three-dimensional space to obtain the group of virtual cells according to the hardware resource information of the target collection module and the processing capability information of the target augmented reality device, comprises:

determining the value of a target processing capability parameter according to the hardware resource information of the target collection module and the processing capability information of the target augmented reality device;

rasterizing the real three-dimensional space to obtain the group of real cells and rasterizing the virtual three-dimensional space to obtain the group of virtual cells according to a first cell size corresponding to the value of the target processing capability parameter, wherein the value of the target processing capability parameter is negatively correlated with the first cell size; or, rasterizing the real three-dimensional space to obtain the group of real cells and rasterizing the virtual three-dimensional space to obtain the group of virtual cells according to a second cell size corresponding to a value range within which the value of the target processing capability parameter falls, wherein a boundary value of the value range within which the value of the target processing capability parameter falls is negatively correlated with the second cell size.

7. The method according to claim 1, wherein determining, from the group of real cells, the real cell set through which the target movement trajectory passes, comprises:

searching the group of real cells for cells at which positions in the target movement trajectory are located, to obtain the real cell set.

8. The method according to claim 1, wherein determining, according to the position relationship between the first virtual cell set and the second virtual cell set, whether the target movement trajectory triggers the target interaction operation of the target virtual interaction object, comprises: detecting, in a case that a target response range is set for the target virtual interaction object in the virtual three-dimensional space and the target response range comprises a third virtual cell set in the virtual three-dimensional space, whether virtual cells in the first virtual cell set are located inside the third virtual cell set, wherein in the virtual three-dimensional space, the second virtual cell set is located inside the third virtual cell set; determining, upon detecting that a virtual cell subset in the first virtual cell set is located inside the third virtual cell set, whether the target movement trajectory triggers the target interaction operation of the target virtual interaction object according to the position relationship between the virtual cell subset in the first virtual cell set and the second virtual cell set; or determining, in a case that the target response range is not set for the target virtual interaction object in the virtual three-dimensional space, whether the target movement trajectory triggers the target interaction operation of the target virtual interaction object according to the position relationship between the first virtual cell set and the second virtual cell set.

9. The method according to claim 8, wherein determining whether the target movement trajectory triggers the target interaction operation of the target virtual interaction object according to the position relationship between the virtual cell subset in the first virtual cell set and the second virtual cell set, comprises:

judging whether the virtual cell subset in the first virtual cell set is located in the second virtual cell set; and determining, when it is judged that virtual cells located in the second virtual cell set exist in the virtual cell subset, that the target movement trajectory triggers the target interaction operation of the target virtual interaction object; or determining the number, of virtual cells of the virtual cell subset in the first virtual cell set, in the second virtual cell set; determining, when the number, of virtual cells in the virtual cell subset, in the second virtual cell set is greater than or equal to a predetermined number threshold, that the target movement trajectory triggers the target interaction operation of the target virtual interaction object; or judging whether the virtual cell subset in the first virtual cell set is located in the second virtual cell set; and determining, when it is judged that virtual cells in the second virtual cell set exist in the virtual cell subset and the retention duration, in the second virtual cell set, of the virtual cells in the virtual cell subset is greater than or equal to a predetermined duration threshold, that the target movement trajectory triggers the target interaction operation of the target virtual interaction object.

10. The method according to claim 1, wherein the method further comprises:

searching log information of the target augmented reality device for an interaction log between the target object and the target virtual interaction object;

determining an anomalous interaction operation between the target object and the target virtual interaction object according to the interaction log between the target object and the target virtual interaction object; and adjusting a trigger condition of the target interaction operation according to the anomalous interaction operation.

11. A non-transitory computer-readable storage medium, the computer-readable storage medium comprising a stored program, wherein the program, when executed by a processor, cause the processor to implement the method as claimed in claim 1.

12. An electronic apparatus, comprising a memory and a processor, wherein the memory stores a computer program, and the processor is configured to run the computer program so as to execute:

display a target augmented reality three-dimensional picture on a target augmented reality device, and display a target virtual interaction object in a virtual three-dimensional space in the target augmented reality three-dimensional picture, wherein the target augmented reality three-dimensional picture is a three-dimensional picture formed by superposing a real three-dimensional picture obtained by photographing in a real three-dimensional space and a virtual three-dimensional picture in the virtual three-dimensional space, the real three-dimensional space is rasterized into a group of real cells, the virtual three-dimensional space is rasterized into a group of virtual cells, and there is a mapping relationship between the group of real cells and the group of virtual cells;

acquire, when identifying a target object in the real three-dimensional space, a target movement trajectory of the target object in the real three-dimensional space;

determine, from the group of real cells, a real cell set through which the target movement trajectory passes;

determine, from the group of virtual cells, a passing first virtual cell set corresponding to the passing real cell set according to the mapping relationship between the group of real cells and the group of virtual cells;

determine, according to the position relationship between the first virtual cell set and a second virtual cell set, whether the target movement trajectory triggers a target interaction operation of the target virtual interaction object, wherein the second virtual cell set comprises virtual cells occupied by the target virtual interaction object in the group of virtual cells; and display a picture corresponding to the target interaction operation on the target augmented reality device in a case that the target movement trajectory triggers the target interaction operation of the target virtual interaction object.

13. The electronic apparatus according to claim 12, the processor is further configured to:

acquiring ranging information obtained by a target collection module performing ranging on the target object at each moment in a group of moments;

determining the position of the target object in the real three-dimensional space at each moment according to the ranging information acquired at each moment; and fitting the position of the target object in the real three-dimensional space at each moment to form the target movement trajectory.

14. The electronic apparatus according to claim 13, the processor is further configured to:

performing the following operations on the acquired ranging information at each moment, wherein when the following operations are performed, each moment is a current moment:

when the target collection module is one ranging module and the ranging information acquired at the current moment represents a current distance between the target object and a preset mark point in the real three-dimensional space, determine the position of the target object in the real three-dimensional space at the current moment according to the position of the preset mark point in the real three-dimensional space and the current distance represented by the ranging information;

in a case that the target collection module comprises multiple ranging modules, the ranging information acquired at the current moment comprises multiple pieces of ranging information obtained by the multiple ranging modules respectively performing ranging on the target object at the current moment, and each piece of ranging information among the multiple pieces of ranging information represents the current distance between the target object and the preset mark point in the real three-dimensional space, determine multiple positions of the target object in the real three-dimensional space at the current moment according to the position of the preset mark point in the real three-dimensional space and multiple current distances represented by the multiple pieces of ranging information; and determine the position of the target object in the real three-dimensional space at the current moment according to the multiple positions of the target object in the real three-dimensional space at the current moment.

15. The electronic apparatus according to claim 14, the processor is further configured to:

perform averaging on three-dimensional coordinates of the multiple positions in the real three-dimensional space to obtain first target three-dimensional coordinates, and determine the position represented by the first target three-dimensional coordinates in the real three-dimensional space as the position of the target object in the real three-dimensional space at the current moment; or perform weighted averaging on the three-dimensional coordinates of the multiple positions in the real three-dimensional space to obtain second target three-dimensional coordinates, and determine the position represented by the second target three-dimensional coordinates in the real three-dimensional space as the position of the target object in the real three-dimensional space at the current moment.

16. The electronic apparatus according to claim 12, the processor is further configured to:

acquire hardware resource information of a target collection module associated with the target augmented reality device and processing capability information of the target augmented reality device, wherein the target collection module is configured to perform ranging on the target object to obtain ranging information, wherein the ranging information is used for determining the target movement trajectory of the target object in the real three-dimensional space; and rasterize the real three-dimensional space to obtain the group of real cells and rasterizing the virtual three-dimensional space to obtain the group of virtual cells according to the hardware resource information of the target collection module and the processing capability information of the target augmented reality device.

17. The electronic apparatus according to claim 16, the processor is further configured to:

determine the value of a target processing capability parameter according to the hardware resource information of the target collection module and the processing capability information of the target augmented reality device;

rasterize the real three-dimensional space to obtain the group of real cells and rasterizing the virtual three-dimensional space to obtain the group of virtual cells according to a first cell size corresponding to the value of the target processing capability parameter, wherein the value of the target processing capability parameter is negatively correlated with the first cell size; or, rasterize the real three-dimensional space to obtain the group of real cells and rasterizing the virtual three-dimensional space to obtain the group of virtual cells according to a second cell size corresponding to a value range within which the value of the target processing capability parameter falls, wherein a boundary value of the value range within which the value of the target processing capability parameter falls is negatively correlated with the second cell size.

18. The electronic apparatus according to claim 12, the processor is further configured to:

detect, in a case that a target response range is set for the target virtual interaction object in the virtual three-dimensional space and the target response range comprises a third virtual cell set in the virtual three-dimensional space, whether virtual cells in the first virtual cell set are located inside the third virtual cell set, wherein in the virtual three-dimensional space, the second virtual cell set is located inside the third virtual cell set; determining, upon detecting that a virtual cell subset in the first virtual cell set is located inside the third virtual cell set, whether the target movement trajectory triggers the target interaction operation of the target virtual interaction object according to the position relationship between the virtual cell subset in the first virtual cell set and the second virtual cell set; or determine, in a case that the target response range is not set for the target virtual interaction object in the virtual three-dimensional space, whether the target movement trajectory triggers the target interaction operation of the target virtual interaction object according to the position relationship between the first virtual cell set and the second virtual cell set.

19. The electronic apparatus according to claim 18, the processor is further configured to:

judge whether the virtual cell subset in the first virtual cell set is located in the second virtual cell set; and determine, when it is judged that virtual cells located in the second virtual cell set exist in the virtual cell subset, that the target movement trajectory triggers the target interaction operation of the target virtual interaction object; or determine the number, of virtual cells of the virtual cell subset in the first virtual cell set, in the second virtual cell set; determine, when the number, of virtual cells in the virtual cell subset, in the second virtual cell set is greater than or equal to a predetermined number threshold, that the target movement trajectory triggers the target interaction operation of the target virtual interaction object; or judge whether the virtual cell subset in the first virtual cell set is located in the second virtual cell set; and determine, when it is judged that virtual cells in the second virtual cell set exist in the virtual cell subset and the retention duration, in the second virtual cell set, of the virtual cells in the virtual cell subset is greater than or equal to a predetermined duration threshold, that the target movement trajectory triggers the target interaction operation of the target virtual interaction object.

* * * * *